Oct. 28, 1952     H. P. HUBERTZ     2,615,964
DIELECTRIC MATERIAL INSPECTION SYSTEM
Filed June 16, 1950
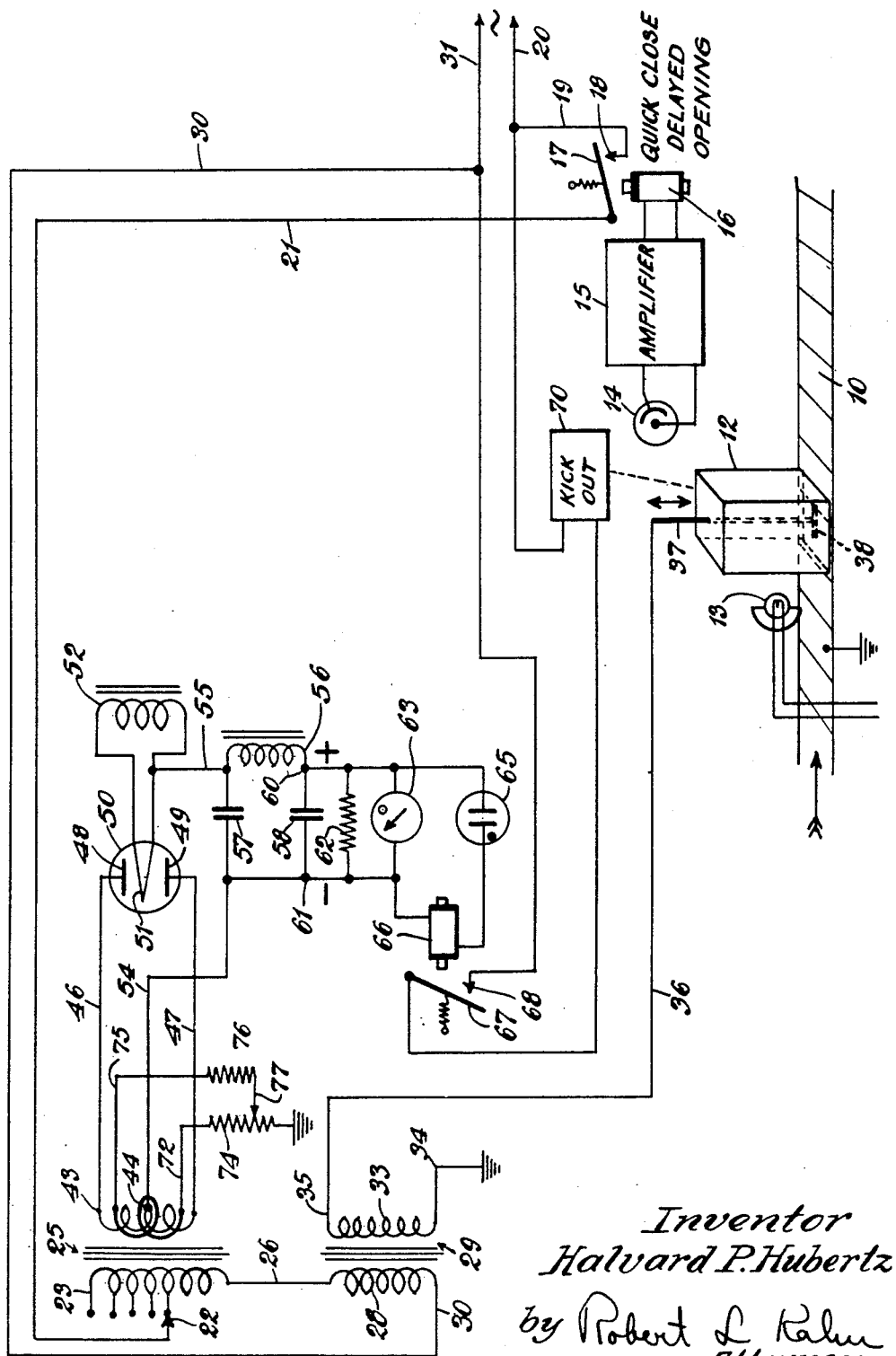
Inventor
Halvard P. Hubertz
by Robert L. Kahn
Attorney Patented Oct. 28, 1952

2,615,964

UNITED STATES PATENT OFFICE 2,615,964

DIELECTRIC MATERIAL INSPECTION SYSTEM

Halvard P. Hubertz, Chicago, Ill.

Application June 16, 1950, Serial No. 168,553

8 Claims. (Cl. 175—320)

This invention relates to a dielectric material inspection system and particularly to an inspection system for molded articles made of dielectric material. The molded articles to be tested are generally in the form wherein an extended area of dielectric material is presented. As one example, although this is merely for the sake of illustration, battery boxes formed of molded rubber or the like will be described. However, it is understood that other articles formed of other materials may also be tested.

Molded materials, particularly those formed of rubber and certain other hard and brittle material frequently develop cracks during cooling which may be due to imperfect molding or too rapid cooling. Such cracks may be so fine as to escape visual detection and, in general, the cracks may tend to weaken the article mechanically so that it may fail in service. While many systems have been devised for inspecting such items for cracks, such systems have been complex and have generally failed after a short time.

A system embodying the present invention is characterized by simplicity and effectiveness of operation together with ruggedness and reliability. Such a system is also endowed with great sensitivity and may be set or calibrated so as to operate within any desired limits. In practice, a system embodying the present invention may be set to have relatively narrow limits so that the slightest imperfection in an item may be indicated on test.

A system embodying the present invention operates upon the fact that the article to be tested offers a predetermined electrical resistance between two test electrodes. In the event that the article under test offers a resistance below a predetermined normal range then means are provided whereby said material or article is subject to an abnormally heavy discharge which tends to mark the region where the defect occurs and also operates means to isolate or separate the article from other articles which have passed inspection.

In general, a system embodying the invention has high and low potential electrodes on opposite sides of the article under test. The electrodes are so disposed and shaped with reference to the article itself that the material under test extends for a substantial distance outside of the interelectrode region. In other words, the material under test cooperates with the electrodes so that all air paths from one electrode to another shall have a low resistance in comparison to any path involving perfect dielectric material as part or all of the path. Upon the existence of a fault in the material under test, its resistance drops to a lower than normal value and the potential between electrodes is sufficient to create a discharge through the material. This discharge circuit is arranged so that a destructive discharge is avoided. This feature is desirable where the fault can be corrected and the material salvaged.

In accordance with this invention a system embodying the present invention has a load transformer for generating the high potential to be impressed upon the electrodes connected in series with a control transformer, the two primaries of these transformers being in series and connected to a suitable source of alternating current. The control transformer has a low power rating in comparison to the load transformer. This control transformer is adapted to supply current to a suitable rectifying system so that a direct potential is generated. This direct potential is normally impressed across a gaseous conduction device and the entire system so adjusted that under normal conditions with an article under test having satisfactory characteristics, no discharge occurs in the gas discharge device. Upon the occurrence of an arc in the material under test, it will be found that the high potential transformer draws more current and this in turn causes more current to flow through the control transformer primary. This results in more current at the rectifier and results in a discharge at the gas tube. Means are provided so that when the gas tube discharges, a suitable relay or other suitable means will kick out or reject the defective article. The load transformer may be of the high leakage type to prevent destructive or dangerous arcs from forming. The filter system and rectifier system cooperate to render the system insensitive to line transients or surges but sensitive to normal test conditions. Thus a sensitive but stable system results.

In order that the invention may be understood, it will now be explained in connection with the drawing wherein the single figure shows a diagrammatic view of a system embodying the present invention.

Referring now to the drawing, 10 is a conveyer of any suitable construction upon which passes the articles to be tested. One article here shown as box 12 is disclosed. Box 12 may be formed of rubber, Bakelite, or any other material having substantial insulating properties. Disposed on one side of box 12 is light source 13 while on the other side of the box is photo-electric cell 14.

Cell 14 is connected to amplifier 15 of any suitable construction and the output of amplifier 15 is fed to relay 16. Relay 16 is of the type which is adapted to close quickly and open slowly. While the drawing shows this in the form of a conventional relay, such devices are available on the market in a wide variety of forms. Thus, for example, certain relay systems using time clock motors are available, other systems using heating coils are available and still other systems using dash pots and the like are available. Such systems may have a variety of operating characteristics and may be adjusted to open or close after a predetermined time interval, which time interval may be adjusted to suit desired conditions. Inasmuch as such relays are known, no detailed showing or description thereof is deemed to be essential.

It is understood that relay 16 need not control the circuits for the tube heaters but that such heaters will be energized to maintain the tubes in a stand-by condition.

In the system so far described, the photo cell system is so designed that when box 12 cuts off the light to the cell, relay 16 will tend to close. It might be stated that when relay 16 closes its contacts, the entire testing system is put into operating condition. Relay 16 has contacts 17 and 18 for controlling the testing system. Contact 18 is fixed and is connected by wire 19 to line 20 of a suitable source of alternating current. Contact 17 is connected by wire 21 to tap 22 of primary 23 of control transformer 25. Transformer 25 may be of the type having a high leakage reactance and, as is usual with such transformers, may have poor voltage regulation.

Transformer 25 has primary 23 provided with a number of taps so that different devices may be tested. Transformer primary 23 is connected by wire 26 to primary 28 of high potential load transformer 29. The lower terminal of transformer primary 28 is connected by wire 30 back to line 31 of the main power supply circuit. Load transformer 29 preferably, though not necessarily, has a high leakage reactance. Its power rating is of a higher order than control transformer 25. The ratio between the two may be ten to one or even higher.

Referring to transformer 29, secondary 33 has one terminal grounded at 24 and has terminal 35 connected by wire 36 to electrode 37. It is understood that transformer secondary 33 will have a high potential generated therein of the order of several thousand volts, the potential being high enough so that a corona or a glow discharge may be formed around electrode 37. It is understood that wire 36 has high potential insulation therein so that substantially no corona discharge will occur on this wire. Such a high potential insulation may assume the form of glass or quartz tubing around the electrode or heavy rubber or other insulation. Electrode 37 will be open to the air and may be disposed within the box either at the bottom or at any predetermined point. While not shown, means may be provided for automatically dropping electrode 37 into a box when the box reaches a testing position. Inasmuch as such automatic means are well known in the art, no detailed showing will be made thereof.

If conveyer 10 is of metal it is grounded. If the conveyer is not of metal, a suitable electrode may be provided so that the bottom of box 12 is disposed on or near a grounded electrode. The resistance through air between ground and electrode 37 is small compared to the resistance between electrode 37 and conveyer 10 directly through the material forming box 12. If any material of box 12, even near the free edge, is defective, its resistance is reduced and a discharge passes through the defective region.

Referring now to control transformer 25, this has two secondaries 43 and 44 in closely coupled relation. The coupling between these two secondaries may be obtained by winding the two coils with a double wire or may be obtained by having separate coils but in close relation on the core so that the coupling between these two secondaries is quite close. Transformer 25 may have low leakage reactance in which case there would be less range of variation of operating characteristics of a particular transformer.

Referring to secondary 43, this is connected by wires 46 and 47 to anodes 48 and 49 of rectifier 50. Rectifier 50 may be of any type and may be of the high vacuum type having cathode 51 supplied by transformer secondary 52.

Transformer secondary 43 has its center connected to wire 54. Cathode 51 of the rectifier is connected by wire 55 to one terminal of inductance 56. Condensers 57 and 58 are connected across from wire 54 to the opposite terminals of inductance 56 and thus provides a filtered direct potential at terminals 60 and 61. Connected to terminals 60 and 61 is ballast 62. In shunt to ballast 62 is meter 63, this being a voltmeter of any conventional construction. The ballast and voltmeter may be combined in one if desired. Also connected across terminal 60 and 61 is gas tube 65 and relay 66 in series with each other. Relay 66 has contacts 67 and 68 controlling a circuit from line wires 20 to 31 through a suitable kickout or reject means 70 of conventional construction. Such a reject means may have suitable means for diverting box 12 from its normal travel upon the conveyer or may have other means for physically removing the box or marking the box so that it may be removed.

Referring to gas tube 65, this gas tube is of conventional construction and as usual with such gas tubes, will break down at one voltage and will cut off at a substantially lower voltage. For proper operation of the system, it is important that gas tube 65 have a substantially constant potential breakdown value. It is also essential that tube 65 break sharply from a substantially nonconducting to a conducting condition. Certain tubes tend to form a small glow and generally increase the glow discharge. However gas tubes for fence chargers for example are available, such tubes having sharp breakdown at a constant value of potential. The cut-out value is not important so long as this cut-out potential is substantially below the breakdown potential. A suitable tube is disclosed in Patent 2,352,871.

Referring back to transformer 25, secondary 44 has one wire connected by wire 72 through potentiometer resistance 74 to ground. The other terminal of secondary 44 is connected by wire 75 through resistor 76 to potentiometer tap 77.

The operation of the system is as follows. Assuming that box 12 or any other item or article to be tested comes along conveyer 10 between light 13 and photo-electric cell 14, the entire system will be put into operative condition by the closure of relay 16. It is also assumed that suitable means, not shown, have dropped electrode 37 down into the box to be tested.

Upon the closure of relay 16, transformers 25 and 29 will have their primaries energized. Transformer 29 will cause a high potential to be generated in secondary 33. This potential will be high enough so that a discharge will be formed around the sides of box 12 from plate electrode 38 right around to conveyer 10. It is understood that this discharge will be in the form of a glow or may be a corona discharge.

As long as the discharge at box 12 is normal, due to the fact that the material of box 12 has no defects, it will be found that transformer secondary 43 causes a normal potential to appear at terminals 60 and 61 having a predetermined value, such as for example around 250 volts. Gas tube 63 should have a higher breakdown potential than the normal potential. If box 12 is satisfactory, gas tube 65 will not break down due to the fact that the current in transformer primary 23 is low. However, should box 12 be defective in any particular, it will be found that a more intense discharge will pass through a crack or other defect in the wall of box 12. This will immediately result in greater current being drawn from load transformer secondary 33 and will cause heavier current to flow through primary 28. Since primary 23 of the control transformer is in series with the high potential transformer 28, it will be apparent that increased current will flow through the primary of control transformer 25. This will cause gas tube 65 to break down thus closing the contacts of relay 66 and energizing the kickout mechanism. The lower power input of control primary 23 as compared to load primary 28 will have the effect of making the power input variation to primary 23 large, percentagewise, between normal and abnormal discharge conditions at box 12.

The operating conditions for a particular line of items to be tested may be adjusted within desired limits. It is also possible to change the operating conditions of the system so that a different line of items may be tested. Thus for example, if the items are battery boxes, the general operating conditions of the system may be set for such boxes and the limits of sensitivity adjusted. On the other hand, if other items than battery boxes are to be tested, then the general operating conditions of the entire system may be changed. The general operating conditions of the system will be determined by the kind of load transformer, high potential output of the load transformer, normal current in the high potential load circuit, electrode area and the like. The sensitivity of the system and to some extent the operating conditions of the system may be controlled by the degree of excitation of control transformer; i. e. the tap position on the control primary, the loading of the control transformer by ballast 74 and 76, the amount of resistance load across the output of the rectified filter terminals, the potential breakdown value of gas tube 65 and the regulation characteristics of both the control and load transformers. In general, the part of the system beyond the rectifier need not be changed. Proper transformers and electrodes may be provided for a particular type of item to be tested. Then potentiometer wiper 77 may be used to control the sensitivity of the system. Voltmeter 63 may have an indication thereon to show the breakdown potential of tube 65. Thus the ballast across secondary 44 may be adjusted so that the normal potential at tube 65 is just below breakdown.

By virtue of winding 44 it is possible to use a low resistance potentiometer readily available on the market for delicate control of the load on transformer 25.

It is apparent that the system shown may be varied within substantial limits without departing from the scope of the invention.

What is claimed is:

1. In a dielectric testing system, the combination of a control transformer and a load transformer, said two transformers having primary and secondary windings, means for connecting the two primaries of said transformers in series to be supplied by a source of power, said load transformer secondary being wound to have a high potential induced therein, a pair of electrodes connected to the load transformer secondary adapted to be disposed on opposite sides of a dielectric material being tested, said electrodes and material under test being so shaped that any air path between the electrodes is longer than any path between electrodes through the material under test, said dielectric material normally having a resistivity high in comparison to the resistivity of air, a rectifying system connected to the secondary of the control transformer, a filter system supplied by said rectifier and adapted to provide a substantially direct potential at the output terminals of said filter system, an electron discharge device and relay connected in series across the output of said filter system, said electron discharge device being normally non-conducting, but breaking down and conducting at a predetermined potential which is higher than the normal potential appearing at the output of said filter system, said load transformer having a power input to the primary large in comparison to the power input to the primary of the control transformer whereby when said dielectric material is free from defects, a normal discharge between electrodes occurs through air with the load transformer and control transformer drawing a normal current from the line and the control transformer providing a normal potential at the filter output lower than the breakdown potential of the electron discharge device and in the event that said material under test is defective, a discharge of greater than normal intensity occurs through the dielectric material thereby causing more than normal current to flow through the two primaries of the transformers to cause said electron discharge device to break down and conduct, thereby energizing said relay, said relay having a load for utilizing the test reaction of the system.

2. The system according to claim 1 wherein said control transformer is of the type having a high leakage reactance.

3. The system according to claim 1 wherein said two transformers are of the type having high leakage reactance.

4. The system according to claim 1 wherein said control transformer is of the high leakage reactance type and has an additional secondary, said two secondaries of the control transformer being closely coupled, and a variable resistance ballast connected across said additional secondary, said additional secondary circuit having a low potential with a comparatively low resistance ballast connected thereto whereby the control transformer may be operated at a suitable part of its regulation characteristic.

5. The system according to claim 1 wherein said control transformer has an additional secondary closely coupled to the other control secondary, variable ballast means connected across said additional secondary to determine the operating conditions of said control transformer, said control transformer being of the high leakage reactance type and a voltmeter connected across the output of said filter system whereby said system may be adjusted so that the sensitivity thereof may be controlled.

6. The system according to claim 1 wherein said control transformer is of the high leakage reactance type and wherein said electron discharge device is a gas tube having two electrodes.

7. In a testing system, the combination of a control transformer and a load transformer, said two transformers having primary and secondary windings respectively, means for connecting the two primaries of said transformers in series to be supplied by a source of power, said load transformer having a normal power input to the primary large in comparison to the normal power input to the primary of the control transformer, means connected to the secondary of said load transformer for drawing a normal load under one condition and for drawing a substantially heavier load under a different condition, potential-responsive means connected across the secondary of the control transformer, said potential-responsive means having one operating condition for normal current through the primary and a different operating condition when the current through the primary is increased, said potential-responsive means being adapted to provide an indication of the condition at the load.

8. The system according to claim 7 wherein said two transformers are of the type having high leakage reactance.

HALVARD P. HUBERTZ.

REFERENCES CITED

The following references are of record in the file of this patent:

UNITED STATES PATENTS

| Number | Name | Date |
| --- | --- | --- |
| 1,919,802 | Pfeiffer | July 25, 1933 |
| 2,268,411 | Luce | Dec. 30, 1941 |
| 2,430,080 | Reynolds | Nov. 4, 1947 |
| 2,586,169 | Kline | Feb. 19, 1952 |